US010377323B2

(12) United States Patent
Beatty

(10) Patent No.: US 10,377,323 B2
(45) Date of Patent: Aug. 13, 2019

(54) THREE-AXIS SHACKLE ASSEMBLY FOR MOUNTED OBJECT AND METHOD FOR USING SAME

(71) Applicant: Ethel M Lennan, Redding, CA (US)

(72) Inventor: Robert Edward Lee Beatty, Redding, CA (US)

(73) Assignee: Ethel M Lennan, Redding, CA (US)

( * ) Notice: Subject to any disclaimer, the term of this patent is extended or adjusted under 35 U.S.C. 154(b) by 0 days.

(21) Appl. No.: 14/713,870

(22) Filed: May 15, 2015

(65) Prior Publication Data
US 2015/0329064 A1 Nov. 19, 2015

Related U.S. Application Data

(60) Provisional application No. 61/994,651, filed on May 16, 2014, provisional application No. 62/025,838, filed on Jul. 17, 2014, provisional application No. 62/114,374, filed on Feb. 10, 2015.

(51) Int. Cl.
B60R 11/06 (2006.01)
B60R 11/00 (2006.01)

(52) U.S. Cl.
CPC .......... B60R 11/06 (2013.01); B60R 2011/004 (2013.01); B60R 2011/0096 (2013.01); Y10T 29/49828 (2015.01); Y10T 29/49961 (2015.01)

(58) Field of Classification Search
CPC .............. B60R 11/06; B60R 2011/004; B60R 2011/0096; B60R 11/00; B60R 9/00; H01M 2/1083; B60K 2001/0444; B60K 2001/0438; B60K 2001/0433; B60K 2001/0427; B60K 2001/0422; B60K 2001/0416; B60K 2001/0411
USPC ................. 248/505, 552, 551, 503; 108/68.5
See application file for complete search history.

(56) References Cited

U.S. PATENT DOCUMENTS

| | | | | |
|---|---|---|---|---|
| 2,588,870 A | * | 3/1952 | Pittman | B60R 16/04 180/68.5 |
| 3,240,407 A | * | 3/1966 | Boak | F17C 13/084 224/42.38 |
| 4,028,913 A | * | 6/1977 | Falk | B60R 11/0205 248/553 |
| 4,129,194 A | * | 12/1978 | Hammond | B60R 16/04 105/51 |
| 4,191,034 A | * | 3/1980 | Froess | B60R 16/04 180/68.5 |
| 4,556,187 A | * | 12/1985 | McLin | H01M 2/1083 248/503 |
| 5,052,198 A | * | 10/1991 | Watts | B60R 16/04 180/68.5 |

(Continued)

Primary Examiner — Christopher Garft

(57) ABSTRACT

Disclosed is shackle assembly that includes a first frame member having a first pair of spaced-apart arm portions and a first base portion connecting the first arm portions to one another and a first securing member extending from one of the first arm portions to the other of the first arm portions, and a second frame member having a second pair of spaced-apart arm portions and a second base portion connecting the second arm portions to one another, where the first securing member is movable between a first position in which the second pair of arm portions are connected by the first securing member and a second position in which the second pair of arm portions are not connected by the first securing member.

13 Claims, 5 Drawing Sheets

(56) References Cited

U.S. PATENT DOCUMENTS

| | | | | |
|---|---|---|---|---|
| 5,076,531 A | * | 12/1991 | Delaney | B60R 11/06 |
| | | | | 211/4 |
| 5,085,395 A | * | 2/1992 | Frater | E05B 73/0082 |
| | | | | 248/205.3 |
| 5,377,947 A | * | 1/1995 | Johnson | B60R 16/04 |
| | | | | 180/68.5 |
| 5,823,502 A | * | 10/1998 | Greiner | B60R 16/04 |
| | | | | 248/503 |
| 6,102,356 A | * | 8/2000 | Huntley | H01M 2/1083 |
| | | | | 248/500 |
| 6,827,169 B1 | * | 12/2004 | Van Hout | B60R 16/04 |
| | | | | 180/68.5 |
| 6,871,829 B2 | * | 3/2005 | Shannon, Jr. | A47G 11/002 |
| | | | | 180/68.5 |
| 7,850,138 B1 | * | 12/2010 | Fox, Jr. | B60R 11/00 |
| | | | | 248/500 |
| 8,728,648 B2 | * | 5/2014 | Choo | H01M 2/1072 |
| | | | | 429/100 |
| D743,326 S | * | 11/2015 | Keller | D12/425 |
| 2004/0238707 A1 | * | 12/2004 | Yoakum, Jr. | B60R 11/00 |
| | | | | 248/311.2 |
| 2011/0031293 A1 | * | 2/2011 | Weber | B60R 11/02 |
| | | | | 224/555 |
| 2013/0299530 A1 | * | 11/2013 | Moore | B60R 11/06 |
| | | | | 224/42.21 |

\* cited by examiner

THREE-AXIS SHACKLE ASSEMBLY FOR MOUNTED OBJECT AND METHOD FOR USING SAME

BACKGROUND

1. Field

The present invention relates to articles of manufacture. More particularly, the present invention relates to a shackle assembly for securing a mounted object and a method for using the shackle assembly.

2. Background

Space is a premium in the interior of many recreational vehicles. Consequently, it is often advantageous to mount accessories and other objects on the outside of the vehicle. For example, auxiliary recreational vehicle batteries can be mounting on the trailer hitch in the front of a recreational vehicle. It, however, is a serious disadvantage of such exterior mountings, that the mounted objects are susceptible to theft. Consequently, there is a desideratum for device that are effective in prevent such theft. There is a further desideratum for theft prevention device that are simple to use and inexpensive.

SUMMARY OF THE INVENTION

Now in accordance with the invention, there has been found a shackle assembly for securing a mounted object and a method for using the shackle assembly that meet these and additional needs. In one aspect of the invention, a three axis shackle assembly for a mounted object comprises a first frame member, a second frame member and a first securing member. In one aspect, the first frame member comprises a pair of spaced-apart first arm portions, each of the first arm portions having a first end and a second end, and a first base portion connecting the first ends of the first arm portions to one another. And in one aspect, the second frame member comprises a pair of spaced-apart second arm portions, each of the second arm portions having a first end and a second end, and a second base portion connecting the first ends of the second arm portions to one another.

In one embodiment of the invention, the first arm portions of the first pair of arm portions form an angle of about ninety degrees with the first base portion and the second arm portions of the second pair of arm portions form an angle of about ninety degrees with the second base portion. And in one embodiment, a protective plate is disposed at the second end of at least one of arms of the first pair of arms. In another embodiment, at least one hole in at least one of the second ends of at least one of the arms of the first pair of arms or the arms of the second pair of arms.

In one aspect of the invention, the first securing member is configured to extend from a first one of the second arm portions to the other of the second arm portions, where the first securing member is movable between a first position in which the second pair of arm portions are connected by the first securing member and a second position in which the second pair of arm portions are not connected by the first securing member. And in one aspect, the three-axis shackle assembly further comprises a second securing member configured to extend from a first one of the first arm portions to the other of the first arm portions, where the second securing member is movable between a first position in which the first pair of arm portions are connected by the second securing member and a second position in which the first pair of arm portions are not connected by the second securing member.

In one embodiment of the invention, the first securing member is integral with the first base portion. And in one embodiment, the first securing member forms a ninety degree angle with the first base portion. In another embodiment, the first securing member is integral with the second securing member. And in one embodiment, the first securing member forms a ninety degree angle with the second securing member.

In another aspect of the invention, the first securing member comprises two substantially parallel connection arms. Each connection arms has a first end and a second end and at least one spacing arm connects the connection arms to one another. In one aspect, the securing member is movable between a first position in which each connection arm is connected to an arm portion and a second position in which there is no connection arm is connected to an arm portion.

Turning to a method for securing a mounted object having a first surface and an opposing second surface with a three-axis shackle assembly in accordance with the invention. In one aspect of the inventive method, the first base portion is placed adjacent the first surface of an object. And in one embodiment, the second base portion is placed adjacent a second opposing surface of the object. And in another aspect; one of the second arm portions is connected to the other of the second arm portions with the first securing member and the first securing member is moved adjacent the first surface of the object.

In an alternative embodiment of the inventive method, the first base portion is placed adjacent the first surface of an object. And in one embodiment, the second base portion is placed adjacent the first surface of the object. And in another aspect; one of the second arm portions is connected to the other of the second arm portions with the first securing member and the first securing member is moved adjacent the second opposing surface of the object.

In one aspect of the inventive method, movement between a first position in which the second pair of arm portions are connected by the first securing member and a second position in which the second pair of arm portions are not connected by the first securing member is prevented. And in one aspect, a pin or a padlock or other obstruction device can be inserted through at least one lock hole formed in at least one of the second ends the arm portions.

BRIEF DESCRIPTION OF THE DRAWINGS

The accompanying drawings, together with the specification, illustrate exemplary embodiments, and, together with the description, serve to explain the principles of these embodiments.

DETAILED DESCRIPTION OF THE PREFERRED EMBODIMENTS

Figure 1:
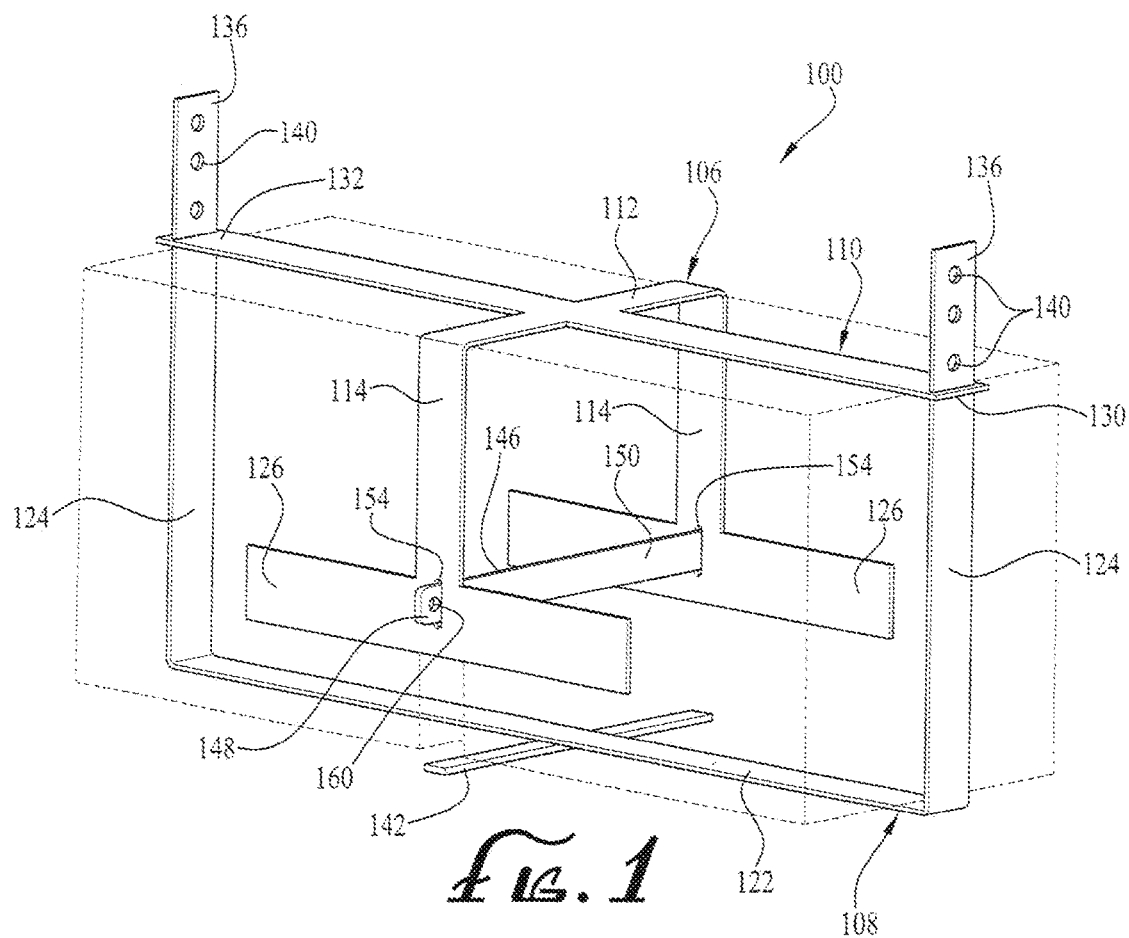
FIG. 1 is a perspective view of one aspect of a three-axis shackle assembly in accordance with one aspect of the invention.

Particular embodiments of the invention are described below in considerable detail for the purpose of illustrating its principles and operation. However, various modifications may be made, and the scope of the invention is not limited to the exemplary embodiments described below. For example, in the embodiments described below, there is described a shackle assembly to secure a recreational vehicle battery mounting to a trailer hitch. However, one skilled in the art will understand that the shackle assembly can be used to secure other objects and to secure recreational vehicle batteries and other objects mounted in other ways.

Shown in FIGS. 1-4 are different views of one embodiment of an assembled three-axis shackle assembly 100 in accordance with one aspect of the invention. The three-axis shackle assembly of this representative embodiment comprises a first frame member 106, a second frame member 108 and at least one securing member 110.

In one aspect of the invention, the first frame member 106 includes a first base portion 112. Extending from the first base portion is a pair of spaced-apart first arm portions 114.

And in one aspect of the invention, the first base portion 112 and the first arm portions 114 all have substantially linear longitudinal axes. In one aspect, the first arm portions are oriented substantially parallel to one another and, in one aspect, each of the first arm portions form a substantially ninety degree angle with the first base portion.

In another aspect of the invention, the second frame member 108 includes a second base portion 122. Extending, from the second portion is a pair of spaced-apart second arm portions 124.

And one aspect of the invention, the second base portion 122 and the second arm portions 124 all have substantially linear longitudinal axes. In one aspect, the second arm portions are oriented substantially parallel to one another and, in one aspect, each of the second arm portions form a substantially ninety degree angle with the second base portion.

In another aspect of the invention, at least one protective plate portion is formed in at least one of the arm portions. As best seen in the representative embodiment shown in FIGS. 1-3, the shackle assembly 100 includes a protective plate portion 126 disposed at the distal end of each of the first arm portions 114 of the first pair of arm portions. And, in the representative embodiment shown in FIGS. 1-3, the longitudinal axis of each plate portion is substantially perpendicular to the longitudinal axis of the first base portion 112.

The first and second frame members may have any suitable cross-section which may be the same as or different from one another. Suitable cross-sections include, without limitation, a polygonal cross-section, such as square or rectangular cross-section, or a circular cross-section. In the representative embodiments shown in FIGS. 1-4, the arm portions have a rectangular cross-section.

In one aspect of the invention, the first securing member 110 has a first end 130 and a second end 132 mountable between one of the second pair of arm portions 124 and the other of the second pair of portions, respectively. As best seen in the representative embodiment shown in FIGS. 1 and 2, in one aspect, the first securing member is formed integrally with the first base portion 112 and in one aspect the first support member forms an angle of ninety degrees with the first base member 112.

Figure 2:
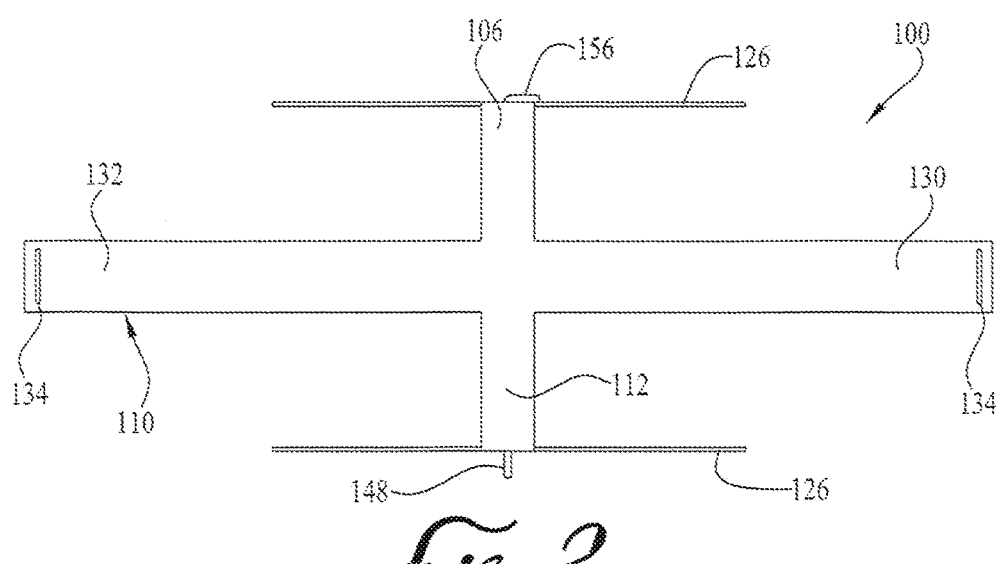
FIG. 2 is a top elevation view of the three-axis shackle assembly shown in FIG. 1.

The first securing member 110 is movable between a first position in which the second pair of arm portions 124 are connected by the first securing member and a second position in which the second pair of arm portions are not connected by the first securing member. As best seen in FIG. 2, in a representative embodiment, a pair of slots 134 formed in the first and second ends 130 and 132, respectively, of the first securing member correspond to the shape of the distal ends 136 of the second pair of arm portions. The distance between the slots correspond to the distance between the distal ends, such that, in a first position, the first securing member can be placed over the distal ends to connect the second pair of arm portions. And in a second position, the first securing member can be removed front the second frame member 108, so the second pair of arm portions are not connected by the first securing member.

As best seen in FIG. 1, in one aspect of the shackle assemble 100, the first securing member 110 is slideable along at least a portion of the second pair of arm portions 124. And in one aspect of the invention, at least one lock hole 140 is formed through at least one of the distal ends 136 of the second pair of arm portions. By placing a pin or a padlock or other obstruction device through the lock hole, after the first securing member has been slipped on the second pair of arm portions past the lock hole or pair of holes, the movement of the first frame member from the first to second position can be prevented. In one aspect of the invention, a plurality of lock holes (three shown in FIGS. 1 and 4) are equally spaced from each of the distal ends of the second pair of arm portions. It is an advantage of this embodiment that through the choice of which lock hole or pair of corresponding lock holes is obstructed, the distance between the second base portion 122 and the first securing member can be limited.

Figure 4:
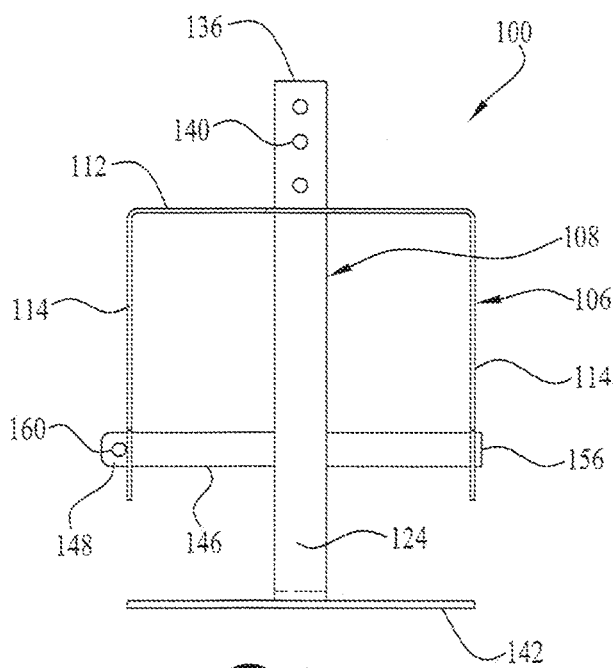
FIG. 4 is an end elevation view of the three-axis shackle assembly shown in FIG. 1.

As best seen in FIGS. 1, 2 and 4, in a representative embodiment, a second base portion support 142 extends outwardly from both sides of the second base frame 122. In one embodiment, the second base portion support has the same length as the first base portion 110 and, in one embodiment, the position of the second base portion corresponds to the position of the first base frame when the shackle assembly 100 is in the first position.

It is an advantage of the shackle assembly 100 in accordance with the invention that it can simultaneously secure one or more objects, such as the two vehicle batteries shown in phantom in FIG. 1 in the representative embodiment shown in FIGS. 1-4, the shackle assembly includes a second securing member 146 having a first end 148 and a second end 150 mountable between one of the first pair of arm portions 114 and the other of the first pair of portions, respectively. As best seen in the representative embodiment shown in FIGS. 1 and 2, in one aspect, the longitudinal axis of the first base portion support is parallel to the longitudinal axis of the second securing member.

Figure 3:
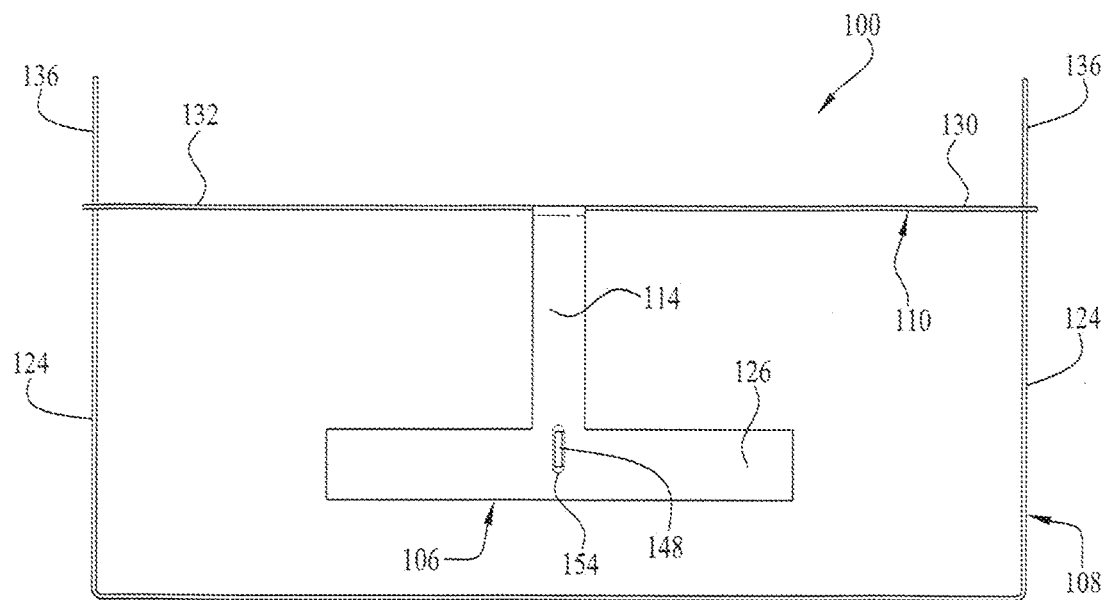
FIG. 3 is a side elevation view of the three-axis shackle assembly shown in FIG. 1.

The second securing member 146 is movable between a first position in which the first pair of arm portions 114 are connected by the second securing member and a second position in which the first pair of arm portions are not connected by the second securing member. As best seen in FIGS. 1 and 3, in a representative embodiment, a pair of slots 154 formed in the distal ends of the first pair of arm portions correspond to the shape of the first end 148 of the second securing member. The length of the second support member is greater than the length of the first base member 112. In the first position, the first pair of arm portions are connected by inserting the first end of the second support member through the second pair of slots until a stop flange 156 disposed at the second end 150 of the second securing member contacts one of the arm portions of the second pair of arm portions and the first end 148 of the second securing member projects past the other arm portion of the second set of arm portions. And in a second position, the second securing member can be removed from the first frame member 108, so the first pair of arm portions are not connected by the second securing member.

As best seen in FIGS. 1 and 4 in one aspect of the shackle assemble 100, at least one lock hole 160 is formed through the portion of the first end 148 of the second securing member 146 that projects past the arm portion of the second set of arm portions. By placing a pin, a padlock or other obstruction device through the lock hole, the removal of the second securing member from the first frame base 106 can be prevented.

Shown in FIGS. 5-8 are different views of an assembled three-axis shackle assembly 200 in accordance with another aspect of the invention. The three-axis shackle assembly of this representative embodiment comprises a first frame member 206, a second frame member 208 and at least one securing member 210.

In one aspect of the invention, the first frame member 206 includes a first base portion 212. Extending from the first base portion is a pair of spaced-apart first arm portions 214.

And in one aspect of the invention, the first base portion 212 and the first arm portions 214 have substantially linear longitudinal axes. In one aspect, the first arm portions are oriented substantially parallel to one another and, in one aspect, each of the first arm portions form a substantially ninety degree angle with the first base portion.

In another aspect of the invention, the second frame member 208 includes a second base portion 222. Extending from the first second portion is a pair of spaced-apart second arm portions 224.

In one aspect of the invention, the second base portion 222 and the first arm portions 214 have substantially linear longitudinal axes. in one aspect, the second arm portions are oriented substantially parallel to one another and, in one aspect, each of the second arm portions form a substantially ninety degree angle with the second base portion.

The first and second frame members may have any suitable cross-section which may be the same as or different from one another. Suitable cross-sections include, without limitation, a polygonal cross-section, such as square or rectangular cross-section, or a circular cross-section. In the representative embodiments shown in FIGS. 5-8, the arm portions have a rectangular cross-section.

Figure 6:
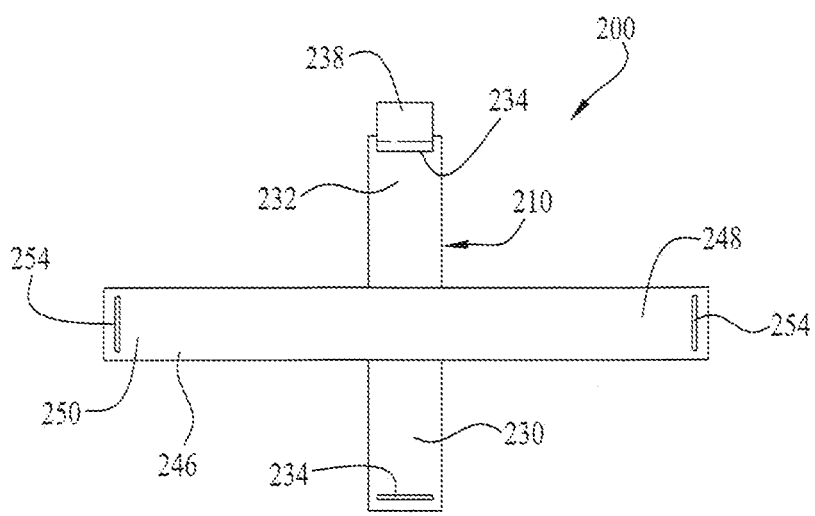
FIG. 6 is a top elevation view of the three-axis shackle assembly shown in FIG. 5.

And in one aspect, the first securing member 210 has a first end 230 and a second end 232 mountable between one of the first pair of arm portions 224 and the other of the second pair of portions, respectively. The first securing member is movable between a first position in which the first pair of arm portions are connected by the first securing member (shown in FIG. and 2) and a second position in which the first pair of arm portions are not connected by the first securing member. As best seen in FIG. 6, in a representative embodiment, a first pair of slots 234 correspond to the shape of the first and second ends of the first pair of arm portions. The distance between the slots corresponds to the distance between the first and second ends, such that, in a first position, the first securing member can be placed over the first and second ends to connect the first pair of arm portions. And in a second position, the first securing member can be removed from the first frame member 206, so the first pair of arm portions are not connected by the first securing member.

Figure 5:
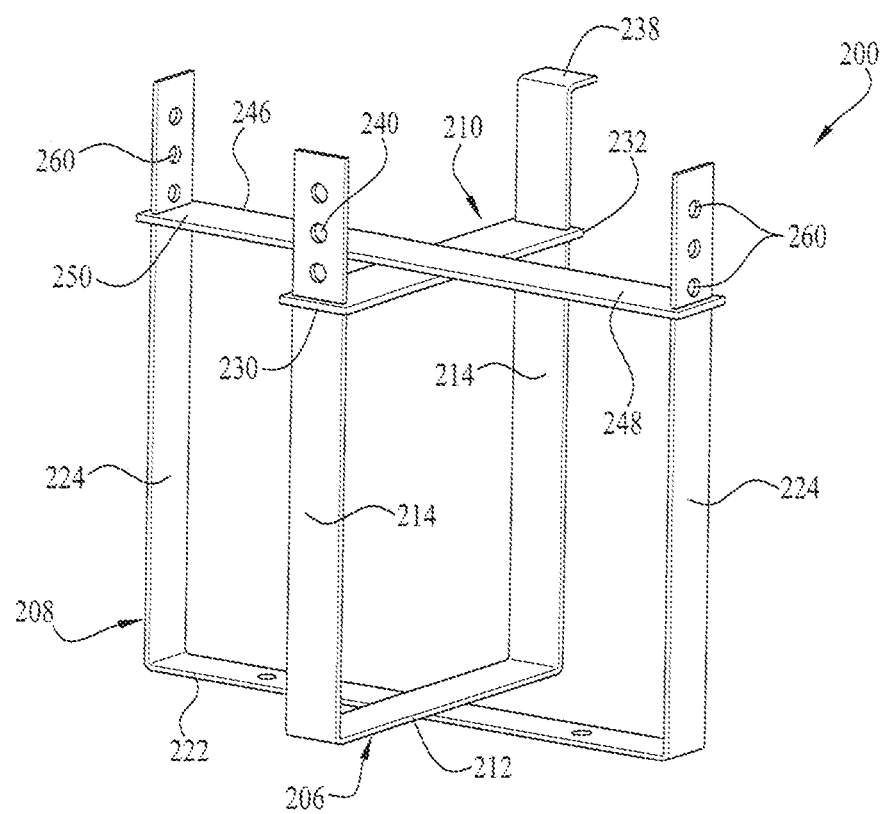
FIG. 5 is a perspective view of a second aspect of a three-axis shackle assembly in accordance with one aspect of the invention.
Figure 7:
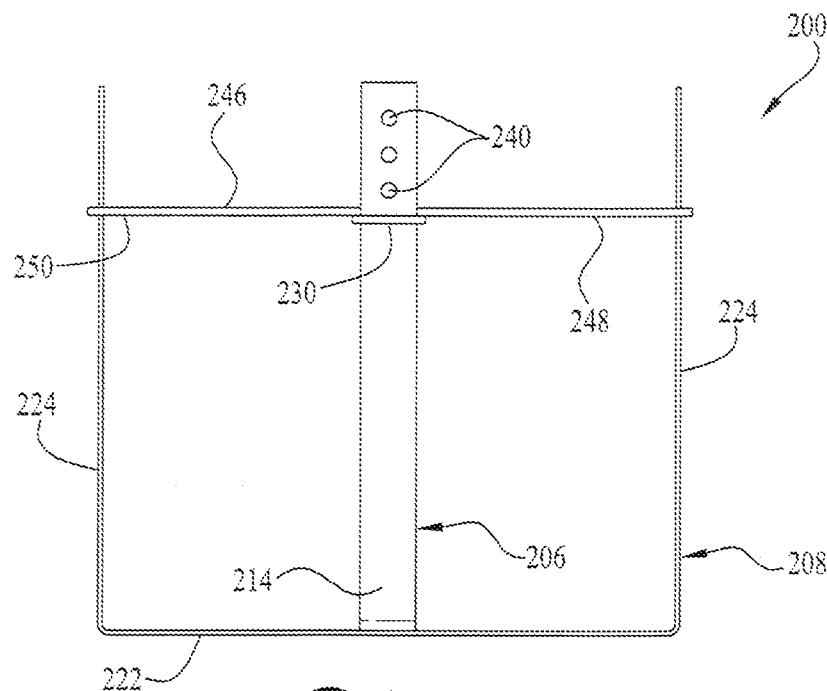
FIG. 7 is a side elevation view of the three-axis shackle assembly shown in FIG. 5.

As best seen in FIG. 5, in one aspect of the shackle assemble 200, the first securing member 210 is slideable along at least a portion of the first pair of arm portions 214. In one embodiment, a retention flange 238 extends outwardly from the distal end of one of arm portions of the first pair of arms. And as best seen in FIGS. 5 and 7, in a representative embodiment of the invention, at least one lock hole 240 is formed through the distal end of the other of the first pair of arm portions. By placing a pin or a padlock or other obstruction device through the lock hole, after the first securing member has been slipped onto the first pair of arm portions past the lock hole, the removal of the first securing member from the first frame member 206 can be prevented. In one aspect of the invention, a plurality of lock holes (three shown in FIGS. 5 and 7 are spaced along the distal end of the other of the first pair of arm portions. It is an advantage of this embodiment that through the choice of which lock hole is obstructed, the distance between the first base portion 212 and the first securing member can be limited.

In one aspect of the shackle assemble 200 shown in FIGS. 5-8, a second securing member 246 having a first end 248 and a second end 250 is movable between a first position in which the second pair of arm portions 224 are connected by the second securing member and a second position in which the second pair of arm portions are not connected by the second securing member. As best seen in FIG. 6, in a representative embodiment, a pair of slots 254 formed in the first and second ends of the second securing member correspond to the shape of the distal ends of the second pair of arm portions. The distance between the slots corresponds to the distance between the distal ends, such that, in a first position, the second securing member can be placed over the distal ends to connect the second pair of arm portions. And in a second position, the second securing member can be removed from the second frame member 208, so the second pair of arm portions are not connected by the second securing member.

Figure 8:
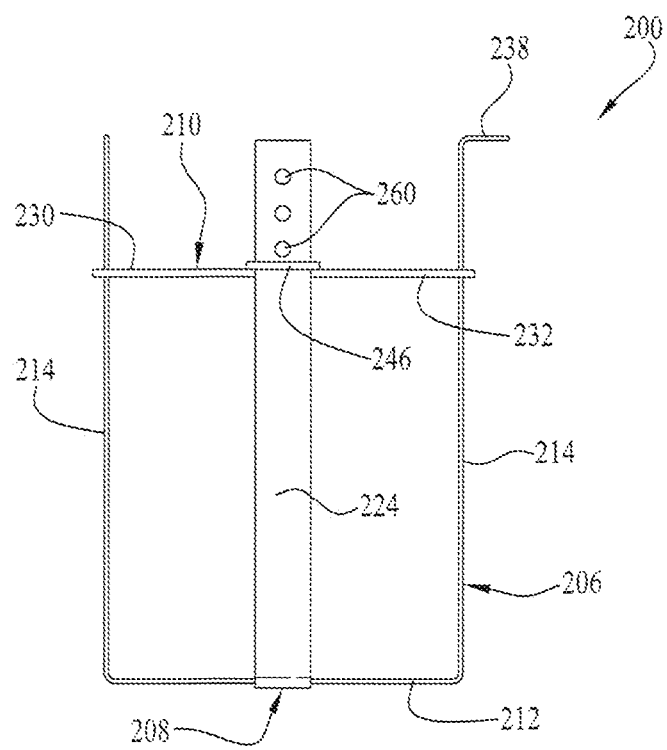
FIG. 8 is an end elevation view of the three-axis shackle assembly shown in FIG. 5.

As best seen in FIG. 5, in a representative embodiment, the second securing member 246 is slideable along at least a portion of the second pair of arm portions 224. And as best seen in FIGS. 5 and 8, in a representative embodiment, at least one lock hole 260 is formed through at least at least one of the distal ends of the second pair of arm portions. By placing a pin or a padlock or other obstruction device through the lock hole, after the second securing member has been slipped on the second pair of arm portions past the lock hole or pair of holes, the removal of the second locking member from the second frame member 208 can be prevented. It is an advantage of this embodiment that through the choice of which lock hole is obstructed, the distance between the second base portion 222 and the second securing member can be limited.

In a representative embodiment, the first securing member 210 is formed integrally with the second securing member 246. And as best seen in FIGS. 5 and 6, in a representative embodiment, the longitudinal axis of the first support member forms an angle of ninety degrees with the longitudinal axis the second support member. Accordingly, when the shackle assemble 200 is assembled, the longitudinal axis of the first support member 212 forms an angle of ninety degrees with the longitudinal axis of the second support member 222.

Figure 9:
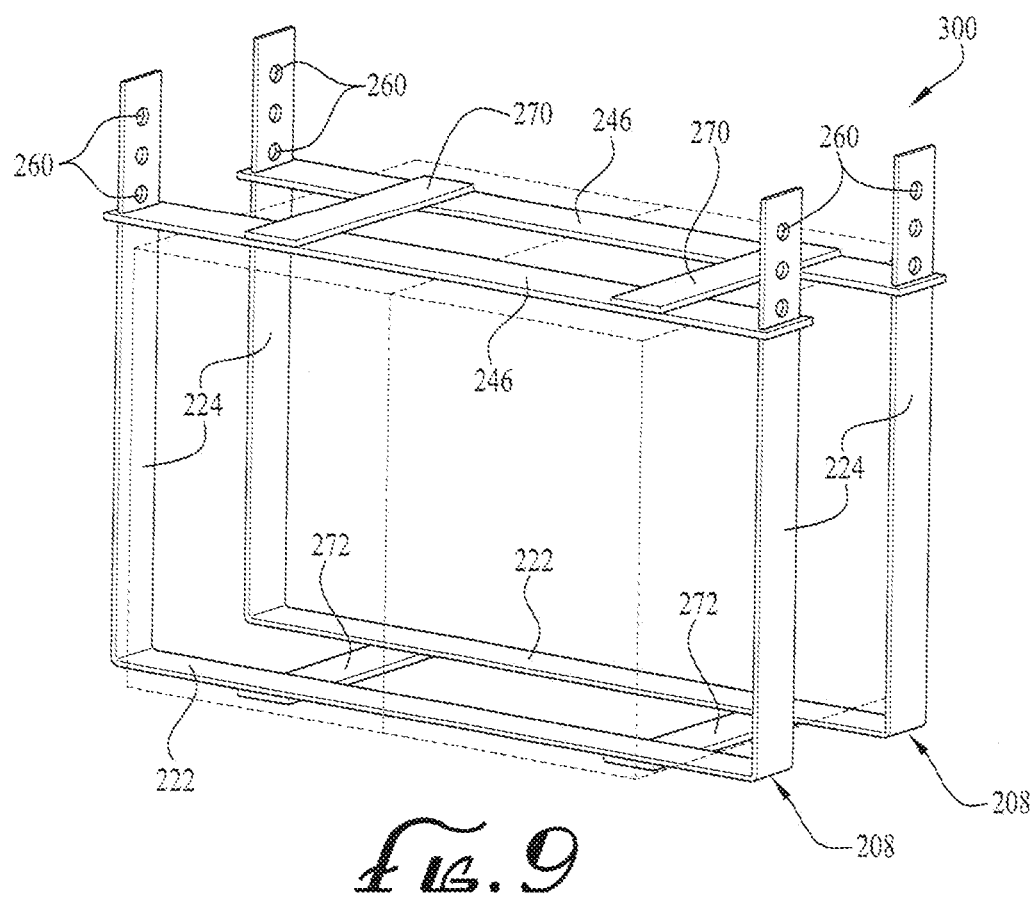
FIG. 9 is a perspective view of a third aspect of a three-axis shackle assembly in accordance with one aspect of the invention.

Shown in FIG. 9 is another aspect of a three-axis shackle assembly 300 in accordance with the invention. In the representative embodiment shown in FIG. 9, the three-axis shackle assembly comprises two frame members 208 and a securing member 310.

In one aspect of the invention, each frame member 208 includes a base portion 222 and extending from the ends of each base portion, a pair of spaced-apart arm portions 224.

And in one aspect of the invention, the securing member 310 is formed of two substantially parallel connection arms 312, each connection arm having a first end 230 and a second end 232. Each connection arms spaced apart by at least one spacing arm 314 (two shown in FIG. 9).

In one aspect of the invention, the securing member 310 is movable between a first position in which the arm portions 224 are connected by the securing member and a second position in which the arm portions are not connected by the securing member. In a representative embodiment, a slot is formed in the each of the first and second ends 230 and 232, respectively, of the securing member correspond to the shape of the distal ends of the arm portions. The distance between the slots correspond to the distance between the distal ends, such that, in a first position, the securing member can be placed over the distal ends to connect the arm portions of both frame members 208. And in a second position, the securing member can be removed from the frame members 208, so the arm portions are not connected by the securing member.

In the representative embodiment illustrated in FIG. 9, the securing member 310 is sliceable along at least a portion of the arm portions 224. And in one aspect of the invention, at least one lock hole 260 is formed through at least one of the distal ends arm portions. By placing a pin or a padlock or other obstruction device through the lock hole, after the securing member has been slipped on the arm portions past the lock hole or pair of holes, the movement of the frame members from the first to second position can be prevented.

In one aspect of the invention, a plurality of lock holes (three shown in FIG. 9) are equally spaced from each of the distal ends of the arm portions. It is an advantage of this embodiment that through the choice of which lock hole or pair of corresponding lock holes is obstructed, the distance between the base portions 222 and the securing member 310 can be limited.

The shackle assembly may be made of any suitable material. Useful materials include metals, such as stainless steel, engineering plastics or carbon fiber materials and the like.

Turning to a method for securing a mounted object having a first surface and an opposing second surface with a three-axis shackle assembly in accordance with the invention. In one aspect, the shackle assembly has a first frame member, second frame member and a first securing member. The first frame member has a pair of spaced-apart first arm portions, each of the first arm portions with a first end and a second end, and a first base portion connecting the first ends of the first arm portions to one another. The second frame member has a pair of spaced-apart second arm portions, each of the second arm portions with a first end and a second end, and a second base portion connecting the first ends of the second arm portions to one another.

In one embodiment of the inventive method, the first base portion is placed adjacent the first surface of an object. And in one embodiment, the second base portion is placed adjacent a second opposing surface of the object. And in another aspect; one of the second arm portions is connected to the other of the second arm portions with the first securing member and the first securing member is moved adjacent the first surface of the object.

In one embodiment of the inventive method, the first base portion is placed adjacent the first surface of an object. And in one embodiment, the second base portion is placed adjacent the first surface of the object. And in another aspect; one of the second arm portions is connected to the other of the second arm portions with the first securing member and the first securing member is moved adjacent the second opposing surface of the object.

In one aspect of the inventive method, movement between a first position in which the second pair of arm portions are connected by the first securing member and a second position in which the second pair of arm portions are not connected by the first securing member is prevented. The movement can be prevented by any suitable technique. For example, a pin or a padlock or other obstruction device can be inserted through at least one lock hole formed in at least one of the second ends the arm portions. By obstructing the lock hole, after the first securing member has been slipped on the second pair of arm portions past the lock hole or pair of holes, the movement of the first frame member from the first to second position is prevented.

I claim:

1. A three-axis shackle assembly for a mounted object comprising:
    a first frame member comprising
        a pair of spaced-apart first arm portions, each of the first arm portions having a first end and a second end, and
        a first base portion connecting the first ends of the first arm portions to one another;
    a second frame member comprising:
        a pair of spaced-apart second arm portions, each of the second arm portions having a first end and a second end, and
        a second base portion connecting the first ends of the second arm portions to one another;
    a first securing member configured to extend from a first one of the second arm portions to the other of the second arm portions, where the first securing member is movable between a first position in which the second pair of arm portions are connected by the first securing member and a second position in which the second pair of arm portions are not connected by the first securing member and
    a second securing member configured to extend from a first one of the first arm portions to the other of the first arm portions, where the second securing member is movable between a first position in which the first pair of arm portions are connected by the second securing member and a second position in which the first pair of arm portions are not connected by the second securing member.

2. The three-axis shackle assembly of claim 1 further comprising a protective plate disposed at the second end of at least one of arms of the first pair of arms.

3. A method for securing a mounted object having a first surface and an opposing second surface comprising:
    placing a first frame member having
        a pair of spaced-apart first arm portions, each of the first arm portions having a first end and a second end, the spaced-apart first arm portions oriented along a first axis and
        a first base portion connecting the first ends of the first arm portions to one another, so that the first base portion is adjacent a first surface of an object, the first base portion oriented along a second axis, the second axis perpendicular to the first axis;

placing a second frame member having
a pair of spaced-apart second arm portions, each of the second arm portions having a first end and a second end, the spaced-apart second arm portions oriented along the first axis and
a second base portion connecting the first ends of the second arm portions to one another, so that the second base portion is adjacent a second opposing surface of the object, the second base portion oriented along a third axis, the third axis orthogonal to the first and second axes; and
a first securing member configured to extend from a first one of the second arm portions to the other of the second arm portions, where the first securing member is movable between a first position in which the second pair of arm portions are connected by the first securing member and a second position in which the second pair of arm portions are not connected by the first securing member, the first securing member oriented along the third axis when in the first position and connecting one of the second arm portions to the other of the second as portions with a first securing member; and moving the first securing member adjacent the first surface of the object.

4. The method of claim 3 wherein the object is a recreational vehicle battery.

5. The method of claim 3 further comprising connecting one of the first arm portions to the other of the first arm portions with a second securing member; and moving the second securing member adjacent the second opposing surface of the object.

6. The method of claim 3 further comprising preventing movement between a first position in which the second pair of arm portions are connected by the first securing member and a second position in which the second pair of arm portions are not connected by the first securing member.

7. The method of claim 6 where the movement is prevented by inserting a lock through a hole the second end of at least one arm portion.

8. A three-axis shackle assembly for a mounted object comprising:
a first frame member comprising:
a pair of spaced-apart first arm portions, each of the first arm portions having a first end and a second end, the spaced-apart first arm portions oriented along a first axis and
a first base portion connecting the first ends of the first arm portions to one another, the first base portion oriented along a second axis, the second axis perpendicular to the first axis;
a second frame member comprising
a pair of spaced-apart second arm portions, each of the second arm portions having a first end and a second end, the spaced-apart second arm portions oriented along the first axis and
a second base portion connecting the first ends of the second arm portions to one another, the second base portion oriented along a third axis, the third axis orthogonal to the first and second axes; and
a first securing member configured to extend from a first one of the second arm portions to the other of the second arm portions, where the first securing member is movable between first position in which the second pair of arm portions are connected by the first securing member and a second position in which the second pair of arm portions are not connected by the first securing member, the first securing member oriented along the third axis when in the first position.

9. The three-axis shackle assembly of claim 8 wherein the first securing member and the first base portion are oriented in the same plane.

10. The three-axis shackle assembly of claim 8 where the first arm portions form an angle of ninety degrees with the first base portion and the second arm portions form an angle of ninety degrees with the second base portion.

11. The three-axis shackle assembly of claim 8 wherein the first securing member and the first base portion are oriented in the same plane.

12. The three-axis shackle assembly of claim 11 wherein the first securing member forms a ninety degree angle with the first base portion.

13. The three-axis shackle assembly of claim 8 further comprising at least one hole in at least one of the second ends of at least one of the arms of the first pair of arms or the arms of the second pair of arms.

* * * * *